(12) United States Patent
Apdalhaliem et al.

(10) Patent No.: US 10,063,164 B2
(45) Date of Patent: Aug. 28, 2018

(54) SYSTEM AND METHOD FOR HARVESTING ENERGY FROM A MOVING VEHICLE

(71) Applicant: The Boeing Company, Chicago, IL (US)

(72) Inventors: Sahrudine Apdalhaliem, Seattle, WA (US); Waeil M. Ashmawi, Bellevue, WA (US)

(73) Assignee: The Boeing Company, Chicago, IL (US)

(*) Notice: Subject to any disclaimer, the term of this patent is extended or adjusted under 35 U.S.C. 154(b) by 298 days.

(21) Appl. No.: 14/987,115

(22) Filed: Jan. 4, 2016

(65) Prior Publication Data

US 2017/0194881 A1 Jul. 6, 2017

(51) Int. Cl.
*H02N 2/18* (2006.01)
*B64D 41/00* (2006.01)
*B60R 16/03* (2006.01)
*B64C 3/18* (2006.01)
(Continued)

(52) U.S. Cl.
CPC .............. *H02N 2/18* (2013.01); *B60R 16/03* (2013.01); *B64C 3/185* (2013.01); *B64C 3/187* (2013.01); *B64D 41/00* (2013.01); *H02J 7/0052* (2013.01); *F16B 5/02* (2013.01); *Y02T 50/44* (2013.01); *Y02T 50/53* (2013.01)

(58) Field of Classification Search
CPC combination set(s) only.
See application file for complete search history.

(56) References Cited

U.S. PATENT DOCUMENTS

| 4,458,234 A | 7/1984 | Brisard |
| 7,488,888 B2 | 2/2009 | Mitchell et al. |

(Continued)

FOREIGN PATENT DOCUMENTS

| DE | 3333285 A1 | 4/1985 |
| KR | 20120057042 A | 6/2012 |
| KR | 20140145929 A | 12/2014 |

OTHER PUBLICATIONS

May 17, 2017 Extended European Search Report.
(Continued)

*Primary Examiner* — An Luu
(74) *Attorney, Agent, or Firm* — Economou Silfin, LLP; John S. Economou

(57) ABSTRACT

A system and method for harvesting energy from a vehicle, e.g., an aircraft, in operation. A plurality of piezoelectric members are coupled between structural members in the vehicle. A first portion of the plurality of piezoelectric members are non-resonant piezoelectric spacers coupled between structural members subject to a constant load during operation of the vehicle. A second portion of the plurality of piezoelectric members are resonant piezoelectric fillers coupled between structural members subject to a cyclical load during operation of the vehicle. Electrical conversion circuitry is coupled to each of the plurality of piezoelectric members for converting the output of each piezoelectric member to usable electrical energy. The electrical conversion circuitry is coupled to an energy storage device for storing the usable electrical energy and/or to an interface circuit for supplying energy for use in an electrical system in the vehicle.

20 Claims, 6 Drawing Sheets

(51) Int. Cl.
*H02J 7/00* (2006.01)
*F16B 5/02* (2006.01)

(56) References Cited

U.S. PATENT DOCUMENTS

| | | | |
|---|---|---|---|
| 7,649,305 B2 * | 1/2010 | Priya | H01L 41/1136 |
| | | | 310/339 |
| 8,143,766 B2 * | 3/2012 | Namuduri | B60G 11/04 |
| | | | 310/339 |
| 8,371,537 B2 | 2/2013 | McAlinden et al. | |
| 8,791,766 B2 * | 7/2014 | Ishii | H03H 9/0542 |
| | | | 310/346 |
| 2008/0092937 A1 | 4/2008 | Mitchell et al. | |
| 2008/0150395 A1 | 6/2008 | Clingman et al. | |
| 2012/0169064 A1 | 7/2012 | Hoffman et al. | |
| 2015/0061375 A1 | 3/2015 | von Heimendahl et al. | |

OTHER PUBLICATIONS

O. Sosnicki, N. Lhermet, F. Claeyssen, Vibration Energy Harvesting in Aircraft Using Piezoelectric Actuators, ACTUATOR 2006, 10th International Conference on New Actuators, Jun. 14-16, 2006, Bremen, Germany.

Renato Caliò et al., Piezoelectric Energy Harvesting Solutions, Sensors 2014, 14, 4755-4790.

* cited by examiner

SYSTEM AND METHOD FOR HARVESTING ENERGY FROM A MOVING VEHICLE

FIELD

This disclosure relates generally to a system and method for harvesting energy from a moving vehicle such as an aircraft.

BACKGROUND

Shims (spacers) and fillers are used at structural interfaces and joints in vehicles such as aircraft. These shims or fillers are used to create a tight-fit tolerance at the structural interfaces or joints to ensure that that the load transfer across the structural members forming the structural interface or joint is efficient. These shims or fillers are formed from aluminum or an equivalent material and, because of the many structural interfaces or joints in a vehicle, can add a great deal of weight to the vehicle, reducing the performance of the vehicle, but without adding any additional benefit to the vehicle. For example, there are many areas on the wing and fuselage of an aircraft where the structural interfaces and joints require significant shimming to fill gaps in order to meet the desired tight-fit tolerance. During use, the stresses imposed on the structural interfaces and joints can be very great. However, the aluminum shims are rigid and simply pass these stresses across the structural interfaces and joints.

Modern vehicles such as aircraft are increasingly using more and more electrical systems, both instead of traditional hydraulic and mechanical systems and based on an increased use of cabin-based electrical systems. The auxiliary power units that are provided to power such electrical systems use large and heavy batteries that may need to be charged prior to use of the vehicle and also, because of the additional weight added by auxiliary power unit, also contribute to reduced performance of the vehicle.

Accordingly, there is a need for a system and method which takes into account these issues.

SUMMARY

In a first aspect, a system for harvesting energy from a vehicle in operation includes a plurality of piezoelectric members coupled between structural members in the vehicle. The system also includes electrical conversion circuitry coupled to each of the plurality of piezoelectric members for converting the output of each piezoelectric member to usable electrical energy. The output or outputs of the electrical conversion circuitry is/are coupled to an energy storage device for storing the usable electrical energy and/or to an interface circuit for supplying energy for use in an electrical system in the vehicle.

In a further embodiment, the plurality of piezoelectric members are non-resonant piezoelectric spacers coupled between structural members in the vehicle subject to a constant load during operation of the vehicle.

In another further embodiment, the plurality of piezoelectric members are resonant piezoelectric fillers coupled between structural members in the vehicle subject to a cyclical load during operation of the vehicle.

In yet another further embodiment, a first portion of the plurality of piezoelectric members may be resonant piezoelectric fillers coupled between structural members in the vehicle subject to a cyclical load at a first predetermined frequency during operation of the vehicle, with each of the plurality of piezoelectric members in the first portion tuned to optimize energy harvesting at the first predetermined frequency. Still further, a second portion of the plurality of piezoelectric members may be resonant piezoelectric fillers coupled between structural members in the vehicle subject to a cyclical load at a second predetermined frequency during operation of the vehicle, with each of the plurality of piezoelectric members in the second portion tuned to optimize energy harvesting at the second predetermined frequency.

In an additional further embodiment, a first portion of the plurality of piezoelectric members may be non-resonant piezoelectric spacers coupled between structural members in the vehicle subject to a constant load during operation of the vehicle and a second portion of the plurality of piezoelectric members may be resonant piezoelectric fillers coupled between structural members in the vehicle subject to a cyclical load during operation of the vehicle. Still further, a first part of the second portion of the plurality of piezoelectric members may be resonant piezoelectric fillers coupled between structural members in the vehicle subject to a cyclical load at a first predetermined frequency during operation of the vehicle, with each of the plurality of piezoelectric members in the first portion tuned to optimize energy harvesting at the first predetermined frequency. In addition, a second part of the second portion of the plurality of piezoelectric members may be resonant piezoelectric fillers coupled between structural members in the vehicle subject to a cyclical load at a second predetermined frequency during operation of the vehicle, with each of the plurality of piezoelectric members in the second portion tuned to optimize energy harvesting at the second predetermined frequency.

In a second aspect, a method for harvesting energy from a moving vehicle receives an output from each of a plurality of piezoelectric members coupled between structural members in the vehicle. Next, the output of each piezoelectric member is converted to usable electrical energy. Finally, at least part of the usable electrical energy is stored in an energy storage device and/or at least part of the usable electrical energy is supplied for use in an electrical system in the vehicle. A first portion of the plurality of piezoelectric members may be non-resonant piezoelectric spacers coupled between structural members in the vehicle subject to a constant load during operation of the vehicle and a second portion of the plurality of piezoelectric members may be resonant piezoelectric fillers coupled between structural members in the vehicle subject to a cyclical load during operation of the vehicle.

In a third aspect, a system for harvesting energy from an aircraft in operation includes a plurality of piezoelectric members coupled between structural members in the aircraft. The system also electrical conversion circuitry coupled to each of the plurality of piezoelectric members for converting the output of each piezoelectric member to usable electrical energy. The output or outputs of the electrical conversion circuitry is/are coupled to an energy storage device for storing the usable electrical energy and/or to an interface circuit for supplying energy for use in an electrical system in the aircraft.

In a further embodiment, the plurality of piezoelectric members may be non-resonant piezoelectric spacers coupled between structural members in the aircraft subject to a constant load during operation of the aircraft. The structural members may be a panel stringer and a rib that together form part of a wing of the aircraft.

In another further embodiment, the plurality of piezoelectric members may be resonant piezoelectric fillers coupled between structural members in the aircraft subject to a cyclical load during operation of the aircraft. The structural members may be a spar chord and a panel that forms the outer skin of the wing.

In yet another further embodiment, a first portion of the plurality of piezoelectric members may be resonant piezoelectric fillers coupled between structural members in the aircraft subject to a cyclical load at a first predetermined frequency during operation of the aircraft. Each of the plurality of piezoelectric members in the first portion may be tuned to optimize energy harvesting at the first predetermined frequency. Further, a second portion of the plurality of piezoelectric members may be resonant piezoelectric fillers coupled between structural members in the aircraft subject to a cyclical load at a second predetermined frequency during operation of the aircraft. Each of the plurality of piezoelectric members in the second portion may be tuned to optimize energy harvesting at the second predetermined frequency.

In an additional further embodiment a first portion of the plurality of piezoelectric members may be non-resonant piezoelectric spacers coupled between structural members in the aircraft subject to a constant load during operation of the aircraft and a second portion of the plurality of piezoelectric members may be resonant piezoelectric fillers coupled between structural members in the aircraft subject to a cyclical load during operation of the aircraft. The structural members having non-resonant piezoelectric spacers coupled there between may be a panel stringer and a rib that together form part of a wing of the aircraft. Further, a first part of the second portion of the plurality of piezoelectric members may be resonant piezoelectric fillers coupled between structural members in the aircraft subject to a cyclical load at a first predetermined frequency during operation of the aircraft, with each of the plurality of piezoelectric members in the first portion tuned to optimize energy harvesting at the first predetermined frequency. In addition, a second part of the second portion of the plurality of piezoelectric members may be resonant piezoelectric fillers coupled between structural members in the aircraft subject to a cyclical load at a second predetermined frequency during operation of the aircraft, with each of the plurality of piezoelectric members in the second portion tuned to optimize energy harvesting at the second predetermined frequency. The structural members having resonant piezoelectric fillers coupled there between may be a spar chord and a panel that forms the outer skin of the wing.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

The shims and fillers used in structural interfaces in vehicles such as aircraft are subjected to high loading during vehicle operation. Some such structural interfaces are typically subjected to a static load during use while other such structural interfaces are subjected to a cyclical load at a particular resonance frequency (or a combination of resonant frequencies) during use. Conventional shims and fillers are typically formed from a material such as aluminum or composite. These materials are able to transfer the loading across the structural interface, but without any ability to extract energy based on such loading. By replacing the conventional materials used for shims and fillers with a piezoelectric material, a great deal of energy can be harvested for use in the electrical systems of the vehicle and/or to charge the batteries for such vehicle. This can improve the performance of the vehicle by reducing the size and weight of the auxiliary power units for the vehicle.

Some of the interfaces in a vehicle are subjected to a static load during use. For example, in an aircraft, the interfaces between the wing and body, the side of body joints and fittings, and the rib to wing panel attachment points are usually subjected to a static load. By replacing the aluminum or composite shims at these points with a non-resonant piezoelectric material, electrical energy can be harvested from the stresses (loading) on these interfaces. Non-resonant piezoelectric material is typically formed from lead-zirconate-titanate (PZT) which has a chemical formula of $Pb(Zr_{1-x}Ti_x)O_3$. The properties of PZT are dependent on the composition ratio of Zr/Ti. This composition ratio is typically varied dependent on crystalline structure formation during the manufacturing process. For PZT to have piezoelectric properties at a nominal temperature, the composition ratio X is typically in the range of 0.042<X<0.380. The composition of PZT can be tailored to achieve maximize power harvesting in the non-resonant mode by having a high value of transversal piezoelectric strain constant ($d_{31}$) and transversal piezoelectric voltage constant ($g_{31}$). These constants are typically identified by suppliers in their material specifications and properties. APC International Ltd is a common supplier of non-resonant piezoelectric materials.

Figure 1:
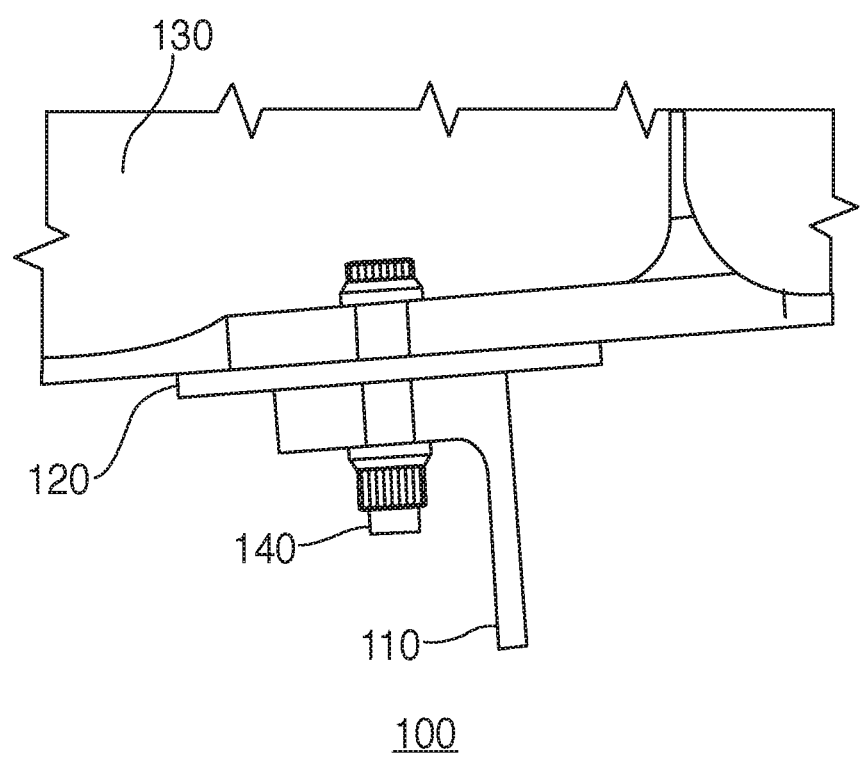
FIG. 1 is a diagram of an interface in a vehicle including a non-resonant piezoelectric spacer according to an aspect of the disclosure.

Referring now to FIG. 1, an example interface (joint) 100 is shown where a panel stringer 110 for an aircraft wing is coupled to a rib 130 for the wing by attachment hardware 140. This joint is typically subjected to a high static load during flight. A non-resonant piezoelectric spacer member 120 (i.e., a shim) is provided between panel stringer 110 and rib 130. The non-resonant piezoelectric spacer member 120 will be subjected to high loading during use of the aircraft. The non-resonant piezoelectric spacer member 120 converts the loading (i.e., a mechanical strain across member 120) into an electric current or voltage. As discussed below, a vehicle such as an aircraft includes hundreds or even thousands of such interfaces 100. By coupling wiring (not shown in FIG. 1) between each non-resonant piezoelectric spacer member 120 at each of the interfaces 100 and appropriate conversion circuitry (as discussed with respect to FIG. 2), the mechanical strain can be converted to electricity that is used, for example, to charge on-board batteries in an auxiliary power unit or for direct use by on-board electronics equipment.

Figure 2:
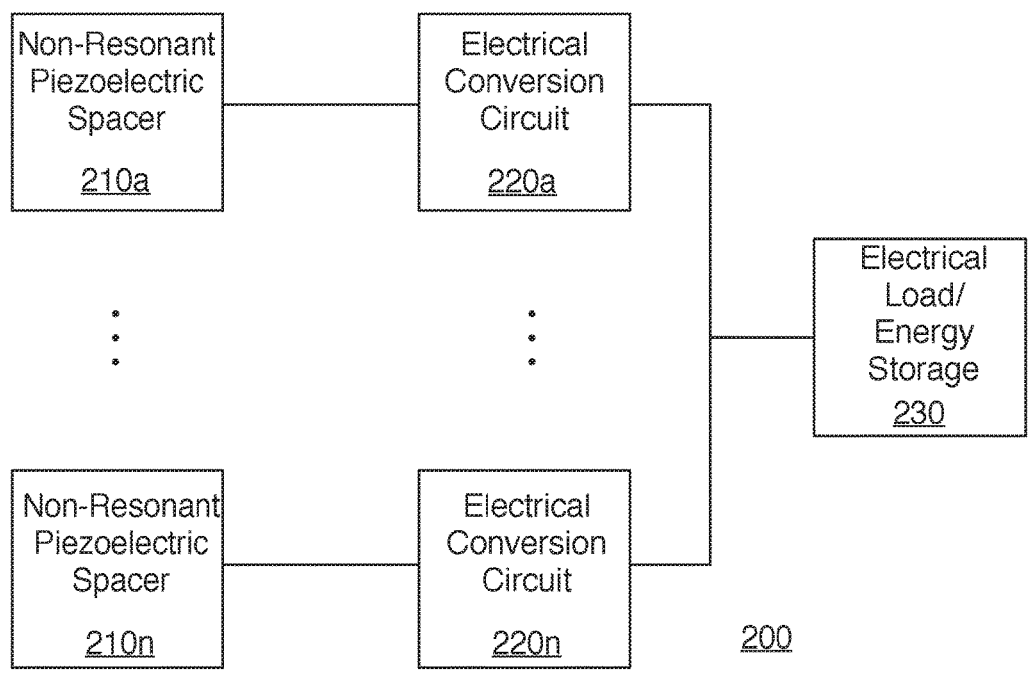
FIG. 2 is block diagram of a system for harvesting energy in a vehicle using non-resonant piezoelectric spacers according to an aspect of the disclosure.

Referring now to FIG. 2, a system 200 for harvesting energy across vehicle interfaces having a static load during use. In particular, system 200 includes a plurality (e.g., a number "n" corresponding to the number of vehicle interfaces in the vehicle in which a non-resonant piezoelectric spacer is added) of non-resonant piezo-electric spacers 210a to 210n. Each of the spacers 210a to 210n may be coupled to a separate corresponding conversion circuit 220a to 210n, with each conversion circuit 220a to 220n coupled to an electrical load 230. Each conversion circuit 220a to 220n converts the output of the associated one of the non-resonant piezo-electric spacers 210a to 210n to a usable form, for example, by the vehicle auxiliary electrical system or to charge an energy storage device. In some cases, only a single conversion circuit 220 may needed for all of the spacers 210a to 210n, for example, when the output of each spacer is a current. In other cases, there may be a smaller number of conversion circuits than the non-resonant piezo-electric spacers 210a to 210n. The electrical load 230 may be a direct connection to the vehicle auxiliary electrical system or may be a direct connection to an energy storage device such as a battery or capacitor.

Other interfaces in a vehicle are subjected to a dynamic load during use which may be cyclical at a particular resonant frequency or combination of resonant frequencies. For example, in an aircraft, fillers are often used between interconnecting structures along the wing span (e.g., along the spar chords) at points subject to wing vibrations. By replacing the aluminum or composite fillers at these points with an appropriate matched resonant piezoelectric material (or sets of overlapping resonant piezoelectric material when multiple dominant resonant frequencies of vibration occur during vehicle use), electrical energy can be harvested from such vibrations at these points. Resonant piezoelectric material is also formed from PZT. The actual composition can be tailored to maximize power harvesting in the resonant mode by having a high value of transversal electromechanical coupling factor ($k_{31}$) and mechanical quality factor ($Q_m$). These constants are typically identified by suppliers in their material specifications and properties. APC International Ltd is a common supplier of resonant piezoelectric materials.

Figure 3:
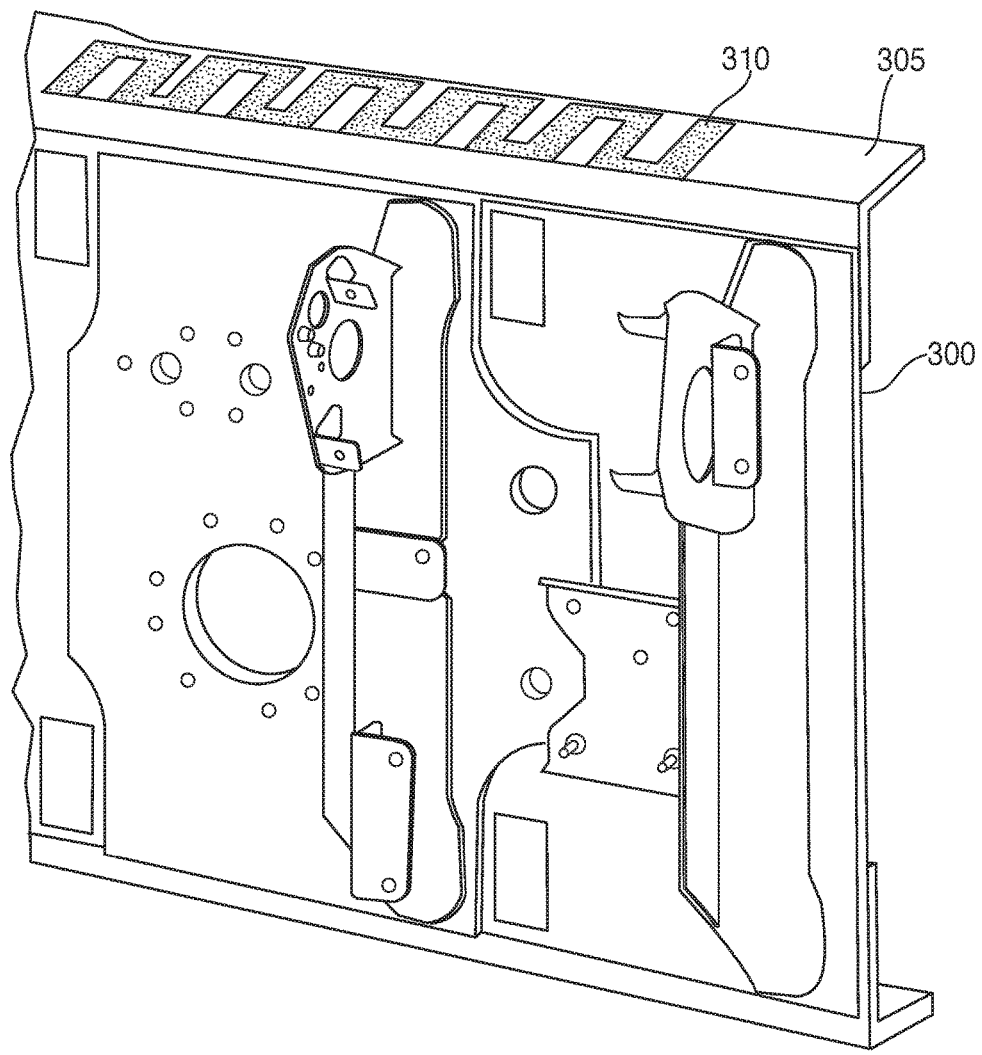
FIG. 3 is a diagram of an interface in a vehicle including a resonant piezoelectric shim according to an aspect of the disclosure.

Referring now to FIG. 3, a spar web 300 for an aircraft wing includes a spar upper chord 305 that is coupled to another structure such as a panel forming the outer skin of the wing. An aluminum or composite filler is often used to mechanically couple spar upper chord 305 to the mating structure (not shown), the filler sandwiched between the spar upper chord 305 and the mating structure such that the vibrations of the wing are transferred through the filler. By replacing the aluminum or composite filler with a resonant piezoelectric member 310 (e.g., a filler) which is coupled to conversion circuitry by wiring not shown in FIG. 3, electrical energy can be harvested based on the vibrations that occur on the aircraft wing. Resonant piezoelectric member 310 is designed to match the main resonant frequency of the wing in order to maximize the amount of energy generated. In addition, when the aircraft wing has more than one main resonant frequency, a number of resonant piezoelectric members 310 can be overlaid at each point on spar upper chord 305, each of the resonant piezoelectric members 310 designed to have different resonant frequencies to match the main resonant frequencies of the aircraft wing. For example, when there are two dominant vibrational frequencies of the aircraft wing, a first portion of the piezoelectric members 310 are designed (tuned) to optimize energy harvesting at a first of the two dominant vibrational frequencies (i.e., a first predetermined frequency) and a second portion of the piezoelectric members 310 are designed (tuned) to optimize energy harvesting at a second of the two dominant vibrational frequencies (i.e., a second predetermined frequency). Each resonant piezoelectric member 310 converts the vibrations into a corresponding AC electric current or voltage. By coupling wiring (not shown in FIG. 1) between each resonant piezoelectric spacer member 310 and appropriate conversion circuitry (as discussed with respect to FIG. 4), the mechanical vibrations can be converted to electricity that is used either to charge on-board batteries in an auxiliary power unit or for direct use by on-board electronics equipment.

Figure 4:
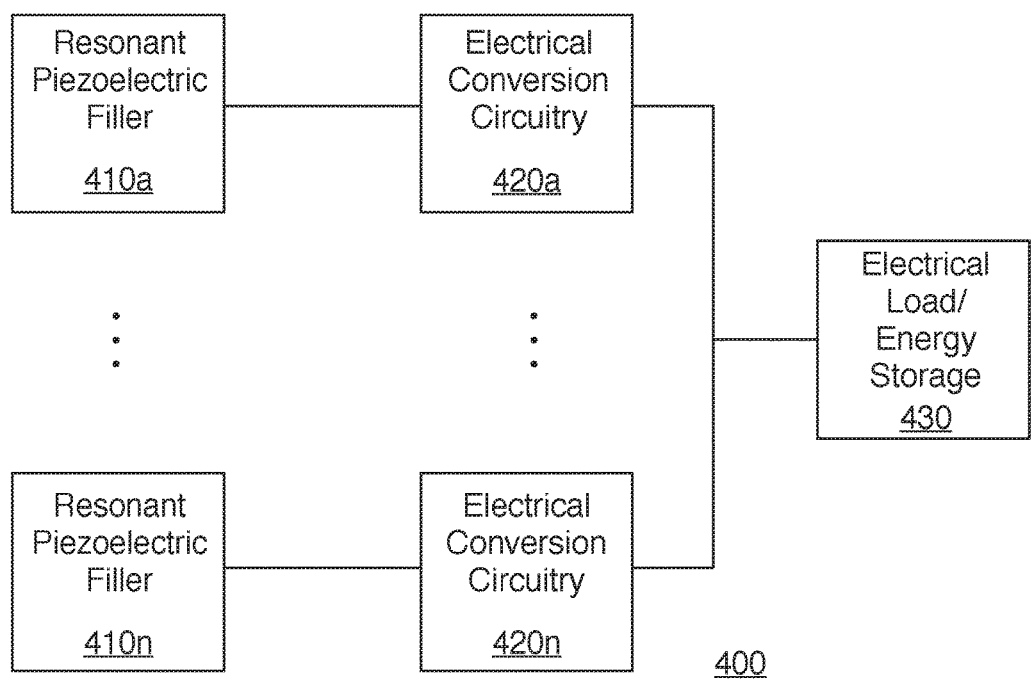
FIG. 4 is a block diagram of a system for harvesting energy in a vehicle using resonant piezoelectric shims according to an aspect of the disclosure.

Referring now to FIG. 4, a system 400 for harvesting energy in vehicle interfaces having a dynamic load during use. In particular, system 400 includes a plurality (e.g., a number "n" corresponding to the number of vehicle interfaces in the vehicle in which a resonant piezoelectric spacer is added) of resonant piezo-electric fillers 410a to 410n. Each of the spacers 410a to 410n may be coupled to a separate corresponding conversion circuit 420a to 420n, with each conversion circuit 420a to 420n coupled to an electrical load 430. Each conversion circuit 420a to 420n converts the output of the associated one of the resonant piezo-electric fillers 410a to 410n to a form usable by the vehicle auxiliary electrical system or to charge an energy storage device. The electrical load 430 may be a direct connection to the vehicle auxiliary electrical system or may be a direct connection to an energy storage device such as a battery or capacitor.

Figure 5:
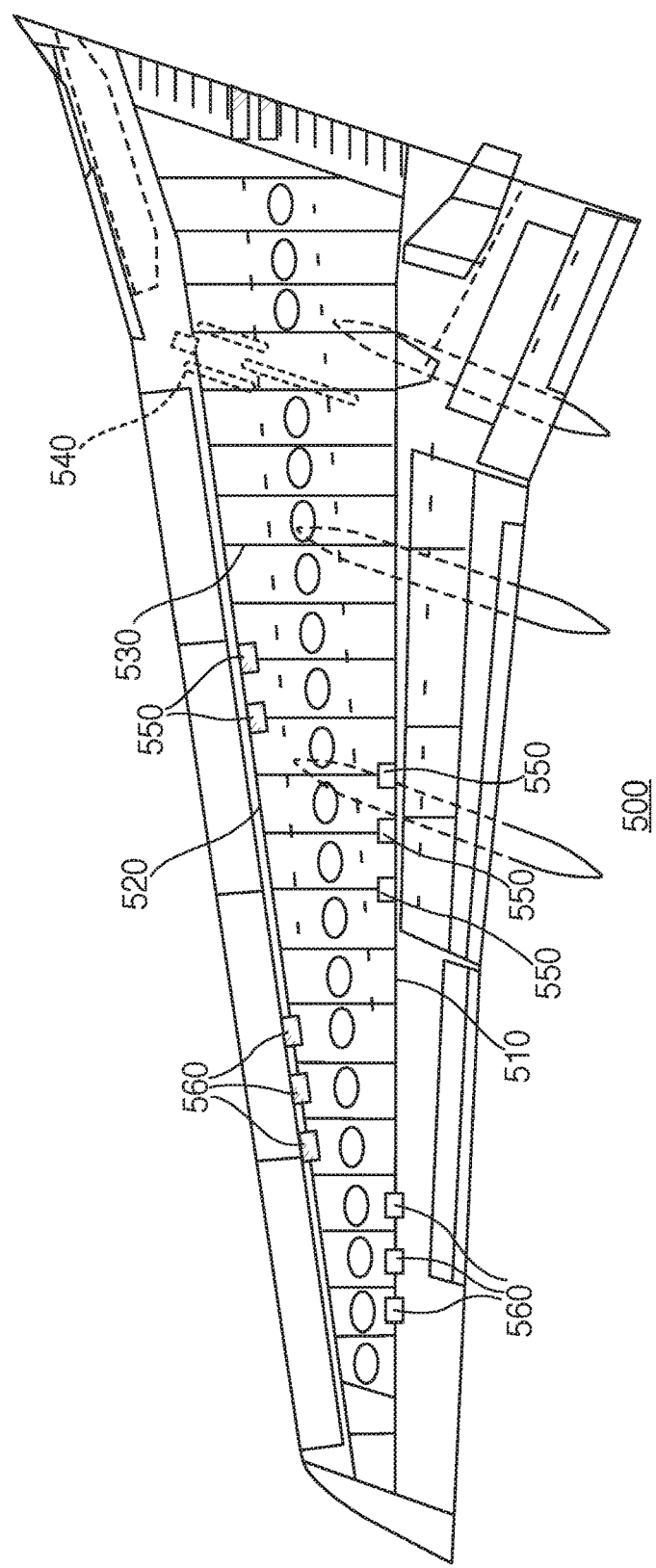
FIG. 5 is a diagram of an aircraft wing showing the placement of non-resonant piezoelectric spacers and resonant piezoelectric shims according to an aspect of the disclosure.

Referring now to FIG. 5, an aircraft wing 500 typically includes a rear spar 510, a front spar 520, a plurality of ribs 530 coupled between the rear spar 510 and the front spar 520, and engine strut fittings 540. As discussed above, non-resonant piezoelectric spacers may be included at interfaces of the wing subjected to a high static load during flight, for example at the connecting interfaces between the each of the ribs 530 and the front spar 520 and rear spar 510 or at the engine strut fittings. Examples of such interface points are shown as ref. no. 550. In addition, resonant piezoelectric filler may be used in areas of the wing subject to one or more resonant frequencies during flight. These areas include surfaces along the front spar 520 and rear spar 510 which are coupled to structures forming the outer surfaces of the wing 500. Examples of such surfaces are shown as ref. no. 560. To maximize the amount of energy harvested from a vehicle having structures subjected to both static and dynamic (cyclical) stresses, an energy harvesting system includes both non-resonant piezoelectric spacers (at interfaces 550) and resonant piezoelectric shims (at surfaces 560).

Figure 6:
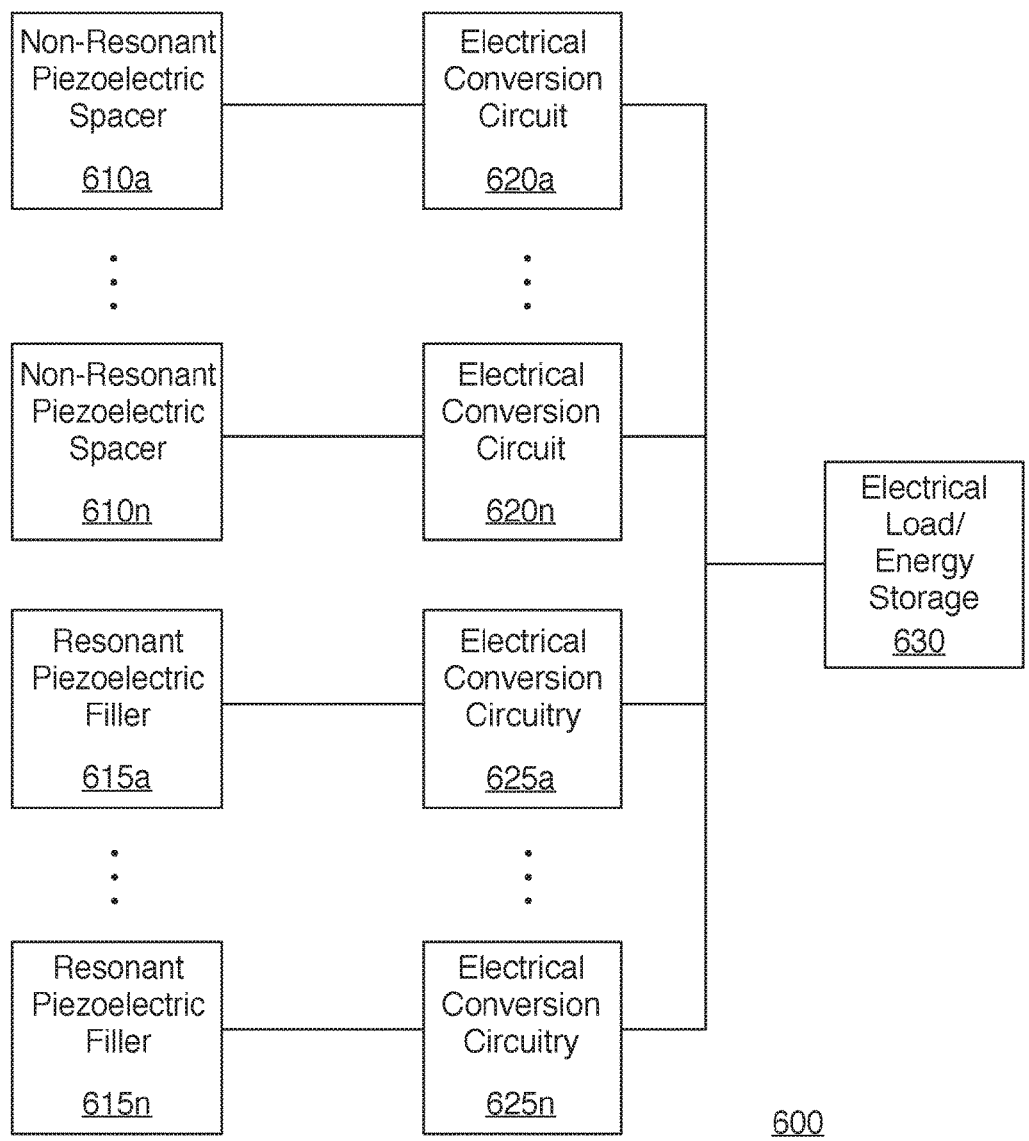
FIG. 6 is a block diagram of a system for harvesting energy in a vehicle using non-resonant piezoelectric spacers and resonant piezoelectric shims according to an aspect of the disclosure.

FIG. 6 shows the energy harvesting system 600 including both a plurality of non-resonant piezo-electric spacers 610a to 610n and a plurality of resonant piezo-electric fillers 615a to 615n. Each of the non-resonant piezo-electric spacers 610a to 610n may be coupled to a separate corresponding conversion circuit 620a to 620n, with each conversion circuit 620a to 620n coupled to an electrical load 630. Each conversion circuit 620a to 620n converts the output of the associated one of the non-resonant piezo-electric spacers 610a to 610n to a form usable by the vehicle auxiliary electrical system or to charge an energy storage device. As discussed above, in some cases, only a single conversion circuit 620 may needed for all of the spacers 610a to 610n. In other cases, there may be a smaller number of conversion circuits than the non-resonant piezo-electric spacers 610a to 610n. The electrical load 630 may be a direct connection to the vehicle auxiliary electrical system or may be a direct connection to an energy storage device such as a battery or capacitor. Each of the spacers 615a to 615n may be coupled to a separate corresponding conversion circuit 625a to 625n, with each conversion circuit 625a to 625n coupled to electrical load 430. Each conversion circuit 625a to 625n converts the output of the associated one of the resonant piezo-electric fillers 615a to 615n to a form usable by the vehicle auxiliary electrical system or to charge an energy storage device.

The spacers and fillers disclosed herein combine to provide a tight joint for efficient load transfer across structural members in a vehicle while also providing a mechanism for harvesting a substantial amount of energy based on either or both constant loading and cyclical loading across such structural members during use of such vehicle. The disclosed spacers and fillers are especially suited for use in an aircraft which includes numerous joints subject to a constant load and numerous joints subject to a cyclical load, as discussed above.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A system for harvesting energy from a vehicle in operation, comprising:
   a plurality of piezoelectric members coupled between structural members in the vehicle, wherein the plurality of piezoelectric members comprise at least one of non-resonant piezoelectric spacers coupled between structural members in the vehicle subject to a constant load during operation of the vehicle and resonant piezoelectric fillers coupled between structural members in the vehicle subject to a cyclical load during operation of the vehicle; and
   electrical conversion circuitry coupled to each of the plurality of piezoelectric members for converting the output of each piezoelectric member to usable electrical energy, the output or outputs of the electrical conversion circuitry coupled to an energy storage device for storing the usable electrical energy and/or to an interface circuit for supplying energy for use in an electrical system in the vehicle.

2. The system of claim 1, wherein the plurality of piezoelectric members comprise non-resonant piezoelectric spacers coupled between structural members in the vehicle subject to a constant load during operation of the vehicle.

3. The system of claim 1, wherein the plurality of piezoelectric members comprise resonant piezoelectric fillers coupled between structural members in the vehicle subject to a cyclical load during operation of the vehicle.

4. The system of claim 1, wherein a first portion of the plurality of piezoelectric members comprise resonant piezoelectric fillers coupled between structural members in the vehicle subject to a cyclical load at a first predetermined frequency during operation of the vehicle, each of the plurality of piezoelectric members in the first portion tuned to optimize energy harvesting at the first predetermined frequency.

5. The system of claim 4, wherein a second portion of the plurality of piezoelectric members comprise resonant piezoelectric fillers coupled between structural members in the vehicle subject to a cyclical load at a second predetermined frequency during operation of the vehicle, each of the plurality of piezoelectric members in the second portion tuned to optimize energy harvesting at the second predetermined frequency.

6. The system of claim 1, wherein a first portion of the plurality of piezoelectric members comprise non-resonant piezoelectric spacers coupled between structural members in the vehicle subject to a constant load during operation of the vehicle and a second portion of the plurality of piezoelectric members comprise resonant piezoelectric fillers coupled between structural members in the vehicle subject to a cyclical load during operation of the vehicle.

7. The system of claim 6, wherein a first part of the second portion of the plurality of piezoelectric members comprise resonant piezoelectric fillers coupled between structural members in the vehicle subject to a cyclical load at a first predetermined frequency during operation of the vehicle, each of the plurality of piezoelectric members in the first portion tuned to optimize energy harvesting at the first predetermined frequency; and wherein a second part of the second portion of the plurality of piezoelectric members comprise resonant piezoelectric fillers coupled between structural members in the vehicle subject to a cyclical load at a second predetermined frequency during operation of the vehicle, each of the plurality of piezoelectric members in the second portion tuned to optimize energy harvesting at the second predetermined frequency.

8. A method for harvesting energy from a moving vehicle, comprising the steps of:
   receiving an output from each of a plurality of piezoelectric members coupled between structural members in the vehicle, the plurality of piezoelectric members comprising at least one of non-resonant piezoelectric spacers coupled between structural members in the vehicle subject to a constant load during operation of the vehicle and resonant piezoelectric fillers coupled between structural members in the vehicle subject to a cyclical load during operation of the vehicle;
   converting the output of each piezoelectric member to usable electrical energy; and
   storing at least part of the usable electrical energy in an energy storage device and/or supplying at least part of the usable electrical energy for use in an electrical system in the vehicle.

9. The method of claim 8, wherein a first portion of the plurality of piezoelectric members comprise non-resonant piezoelectric spacers coupled between structural members in the vehicle subject to a constant load during operation of the vehicle and a second portion of the plurality of piezoelectric members comprise resonant piezoelectric fillers coupled between structural members in the vehicle subject to a cyclical load during operation of the vehicle.

10. A system for harvesting energy from an aircraft in operation, comprising:
- a plurality of piezoelectric members coupled between structural members in the aircraft, wherein the plurality of piezoelectric members comprise at least one of non-resonant piezoelectric spacers coupled between structural members in the vehicle subject to a constant load during operation of the vehicle and resonant piezoelectric fillers coupled between structural members in the vehicle subject to a cyclical load during operation of the vehicle; and
- electrical conversion circuitry coupled to each of the plurality of piezoelectric members for converting the output of each piezoelectric member to usable electrical energy, the output or outputs of the electrical conversion circuitry coupled to an energy storage device for storing the usable electrical energy and/or to an interface circuit for supplying energy for use in an electrical system in the aircraft.

11. The system of claim 10, wherein the plurality of piezoelectric members comprise non-resonant piezoelectric spacers coupled between structural members in the aircraft subject to a constant load during operation of the aircraft.

12. The system of claim 11, wherein the structural members comprise a panel stringer and a rib that together form part of a wing of the aircraft.

13. The system of claim 10, wherein the plurality of piezoelectric members comprise resonant piezoelectric fillers coupled between structural members in the aircraft subject to a cyclical load during operation of the aircraft.

14. The system of claim 13, wherein the structural members comprise a spar chord and a panel that forms the outer skin of the wing.

15. The system of claim 10, wherein a first portion of the plurality of piezoelectric members comprise resonant piezoelectric fillers coupled between structural members in the aircraft subject to a cyclical load at a first predetermined frequency during operation of the aircraft, each of the plurality of piezoelectric members in the first portion tuned to optimize energy harvesting at the first predetermined frequency.

16. The system of claim 15, wherein a second portion of the plurality of piezoelectric members comprise resonant piezoelectric fillers coupled between structural members in the aircraft subject to a cyclical load at a second predetermined frequency during operation of the aircraft, each of the plurality of piezoelectric members in the second portion tuned to optimize energy harvesting at the second predetermined frequency.

17. The system of claim 10, wherein a first portion of the plurality of piezoelectric members comprise non-resonant piezoelectric spacers coupled between structural members in the aircraft subject to a constant load during operation of the aircraft and a second portion of the plurality of piezoelectric members comprise resonant piezoelectric fillers coupled between structural members in the aircraft subject to a cyclical load during operation of the aircraft.

18. The system of claim 17, wherein the structural members having non-resonant piezoelectric spacers coupled there between comprise a panel stringer and a rib that together form part of a wing of the aircraft.

19. The system of claim 17, wherein a first part of the second portion of the plurality of piezoelectric members comprise resonant piezoelectric fillers coupled between structural members in the aircraft subject to a cyclical load at a first predetermined frequency during operation of the aircraft, each of the plurality of piezoelectric members in the first portion tuned to optimize energy harvesting at the first predetermined frequency; and wherein a second part of the second portion of the plurality of piezoelectric members comprise resonant piezoelectric fillers coupled between structural members in the aircraft subject to a cyclical load at a second predetermined frequency during operation of the aircraft, each of the plurality of piezoelectric members in the second portion tuned to optimize energy harvesting at the second predetermined frequency.

20. The system of claim 19, wherein the structural members having resonant piezoelectric fillers coupled there between comprise a spar chord and a panel that forms the outer skin of the wing.

* * * * *